(12) United States Patent
Farley et al.

(10) Patent No.: US 9,253,945 B2
(45) Date of Patent: Feb. 9, 2016

(54) SELF-ADJUSTING OBJECT DEFLECTOR FOR AN AGRICULTURAL HARVESTER FEEDER

(75) Inventors: Herbert M. Farley, Elizabethtown, PA (US); Nathan E. Isaac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/618,139

(22) Filed: Sep. 14, 2012

(65) Prior Publication Data

US 2014/0075903 A1   Mar. 20, 2014

(51) Int. Cl.
*B65G 45/00* (2006.01)
*A01D 41/16* (2006.01)
*A01D 61/00* (2006.01)
*A01D 61/04* (2006.01)

(52) U.S. Cl.
CPC .............. *A01D 41/16* (2013.01); *A01D 61/008* (2013.01); *A01D 61/04* (2013.01)

(58) Field of Classification Search
CPC ........ B65G 45/16; B65G 45/12; B65G 45/14; B65G 45/10
USPC ........................ 198/499, 494, 497; 56/10.2 R
See application file for complete search history.

(56) References Cited

U.S. PATENT DOCUMENTS

| | | | | |
|---|---|---|---|---|
| 2,610,730 A * | 9/1952 | Weir | ............................ | 198/497 |
| 2,784,836 A * | 3/1957 | Le Tourneau | ................. | 198/834 |
| 3,206,011 A * | 9/1965 | Hill et al. | ....................... | 198/494 |
| 3,343,286 A * | 9/1967 | Ray, Jr. et al. | .................. | 37/413 |
| 3,414,116 A * | 12/1968 | Oury | ............................... | 198/497 |
| 3,504,786 A | 4/1970 | Matson | | |
| 3,631,980 A * | 1/1972 | Hamachek, III | .............. | 209/384 |
| 3,785,472 A | 1/1974 | Mathews | | |
| 3,841,469 A * | 10/1974 | Scott et al. | ..................... | 198/617 |
| 3,934,362 A * | 1/1976 | Hyler | ................................ | 37/415 |
| 3,995,383 A * | 12/1976 | Breitenstein et al. | ........... | 37/431 |
| 4,143,757 A * | 3/1979 | Wallenfang | .................... | 198/494 |
| 4,156,465 A * | 5/1979 | Porter | ............................. | 171/14 |
| 4,189,046 A * | 2/1980 | Ward et al. | ..................... | 198/499 |
| 4,321,996 A | 3/1982 | Sancken et al. | | |
| 4,365,706 A * | 12/1982 | Bright | ............................ | 198/499 |
| 4,811,833 A | 3/1989 | Slikker | | |
| 4,944,384 A | 7/1990 | Herron | | |
| 5,109,976 A * | 5/1992 | Mohri et al. | ................... | 198/498 |
| 5,875,881 A | 3/1999 | Brink | | |
| 5,931,280 A * | 8/1999 | Nissen | .......................... | 198/499 |
| 5,976,013 A | 11/1999 | Hamann | | |
| 6,152,290 A * | 11/2000 | Mott et al. | ..................... | 198/499 |
| 6,360,875 B1 * | 3/2002 | Altemus et al. | ................ | 198/499 |

(Continued)

FOREIGN PATENT DOCUMENTS

CN     103287826 A *  9/2013 ............. B65G 45/12
EP     1769670 A1     4/2007

*Primary Examiner* — Árpád Fábián-Kovács
(74) *Attorney, Agent, or Firm* — Patrick M. Sheldrake

(57) ABSTRACT

A feeder assembly for an agricultural harvester, including a first shaft, a second shaft opposite the first shaft, a chain extending around the first shaft and the second shaft, wherein the chain is configured to convey agricultural through the agricultural harvester, and a self-adjusting object deflector assembly positioned between the first shaft and the second shaft, wherein the self-adjusting object deflector assembly comprises a deflector biased against the chain and configured to block the agricultural material from interfering with a connection between the chain and the first shaft.

9 Claims, 4 Drawing Sheets

(56) References Cited

U.S. PATENT DOCUMENTS

| | | | |
|---|---|---|---|
| 6,681,919 B1 * | 1/2004 | Brink | 198/499 |
| 6,766,896 B1 * | 7/2004 | Lee et al. | 198/497 |
| 6,874,616 B2 * | 4/2005 | DeVries et al. | 198/499 |
| 6,978,881 B2 * | 12/2005 | Brink | 198/499 |
| 6,991,088 B1 * | 1/2006 | Smith et al. | 198/499 |
| 7,051,862 B1 * | 5/2006 | Smith et al. | 198/499 |
| 7,093,706 B2 * | 8/2006 | DeVries et al. | 198/499 |
| 7,216,756 B2 * | 5/2007 | Swinderman | 198/499 |
| 7,428,960 B2 * | 9/2008 | Hall | 198/499 |
| 7,556,140 B2 * | 7/2009 | Swinderman et al. | 198/499 |
| 7,565,962 B2 * | 7/2009 | Thew | 198/497 |
| 7,669,708 B2 * | 3/2010 | Swinderman et al. | 198/499 |
| 7,743,909 B2 * | 6/2010 | Berchtold | 198/498 |
| 7,766,736 B2 | 8/2010 | Ramp et al. | |
| 7,775,341 B2 * | 8/2010 | Swinderman et al. | 198/499 |
| 7,798,310 B2 * | 9/2010 | Veenhof | 198/499 |
| 7,819,237 B2 | 10/2010 | Felton | |
| 7,987,966 B2 * | 8/2011 | DeVries et al. | 198/497 |
| 8,028,819 B1 * | 10/2011 | Swinderman | 198/499 |
| 8,037,997 B2 * | 10/2011 | Swinderman et al. | 198/494 |
| 8,042,678 B2 | 10/2011 | Schwarze | |
| 8,167,114 B2 * | 5/2012 | Khanania | 198/499 |
| 8,201,682 B2 * | 6/2012 | DeVries | 198/499 |
| 2005/0148416 A1 * | 7/2005 | Naude | 474/49 |
| 2010/0116621 A1 * | 5/2010 | DeVries | 198/499 |

* cited by examiner

SELF-ADJUSTING OBJECT DEFLECTOR FOR AN AGRICULTURAL HARVESTER FEEDER

BACKGROUND

The invention relates generally to agricultural equipment, such as harvesters, and more specifically, to a self-adjusting object deflector for an agricultural harvester feeder.

A harvester may be used to harvest agricultural crops, such as barley, beans, corn, cotton, flax, oats, rye, soybeans, wheat, grass seed, or other plant seed bearing crops. Moreover, a combine (e.g., combine harvester) is a specific type of harvester generally used to harvest grains (e.g., barley, corn, flax, oats, rye, soybeans, wheat, etc.). Accordingly, a combine may be used to separate a plant into different agricultural materials, such as separating corn ears from the stalks. During operation of a combine, the harvesting process begins by removing a portion of the plant from the ground via a cutting and gathering device (e.g., a header). The combine then moves the plant from the header into the combine with a feeder system. Once inside the combine the plant undergoes processes that separate it into different agricultural materials (e.g., stalks, ears, grain, etc.).

A combine that harvests corn may include, a feeder system that catches and conveys the corn from the header to the combine threshing system using chains and corn engaging slats coupled to the chains. The chains run on gears (e.g., sprockets) that move the chains in a continuous loop. While conveying the corn to the combine, corn cobs may feed into the chain/gear interface, thereby interfering with the connection, e.g., causing the chains to uncouple from the gears or to skip links. A chain that uncouples or skips links may interfere with the material feeding process, and/or induce wear on the feeder components.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a feeder assembly for an agricultural harvester, including a first shaft, a second shaft opposite the first shaft, a chain extending around the first shaft and the second shaft, wherein the chain is configured to convey agricultural material through the agricultural harvester, and a self-adjusting object deflector assembly positioned between the first shaft and the second shaft, wherein the self-adjusting object deflector assembly comprises a deflector biased against the chain and configured to block the agricultural material from interfering with a connection between the chain and the first shaft.

In another embodiment, a feeder assembly for an agricultural harvester including, a self-adjusting object deflector assembly including a deflector having a deflector arm, and a biasing member connected to the deflector arm, and configured to urge the deflector arm toward a belt or chain, wherein the belt or chain is configured to convey agricultural material through the agricultural harvester, and the deflector is configured to block the agricultural material from interfering with a connection between the belt or chain and a shaft.

In a further embodiment, a feeder assembly, including a first shaft with multiple protrusions, a second shaft with multiple protrusions opposite the first shaft; a belt extending around the first shaft and the second shaft, wherein the protrusions on the first and second shafts engage apertures in the belt; and a self-adjusting object deflector assembly in contact with the belt and positioned between the first shaft and the second shaft, and wherein the self-adjusting object deflector assembly is configured to block agricultural material from interfering with the connection between the belt and the first shaft.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Figure 1:
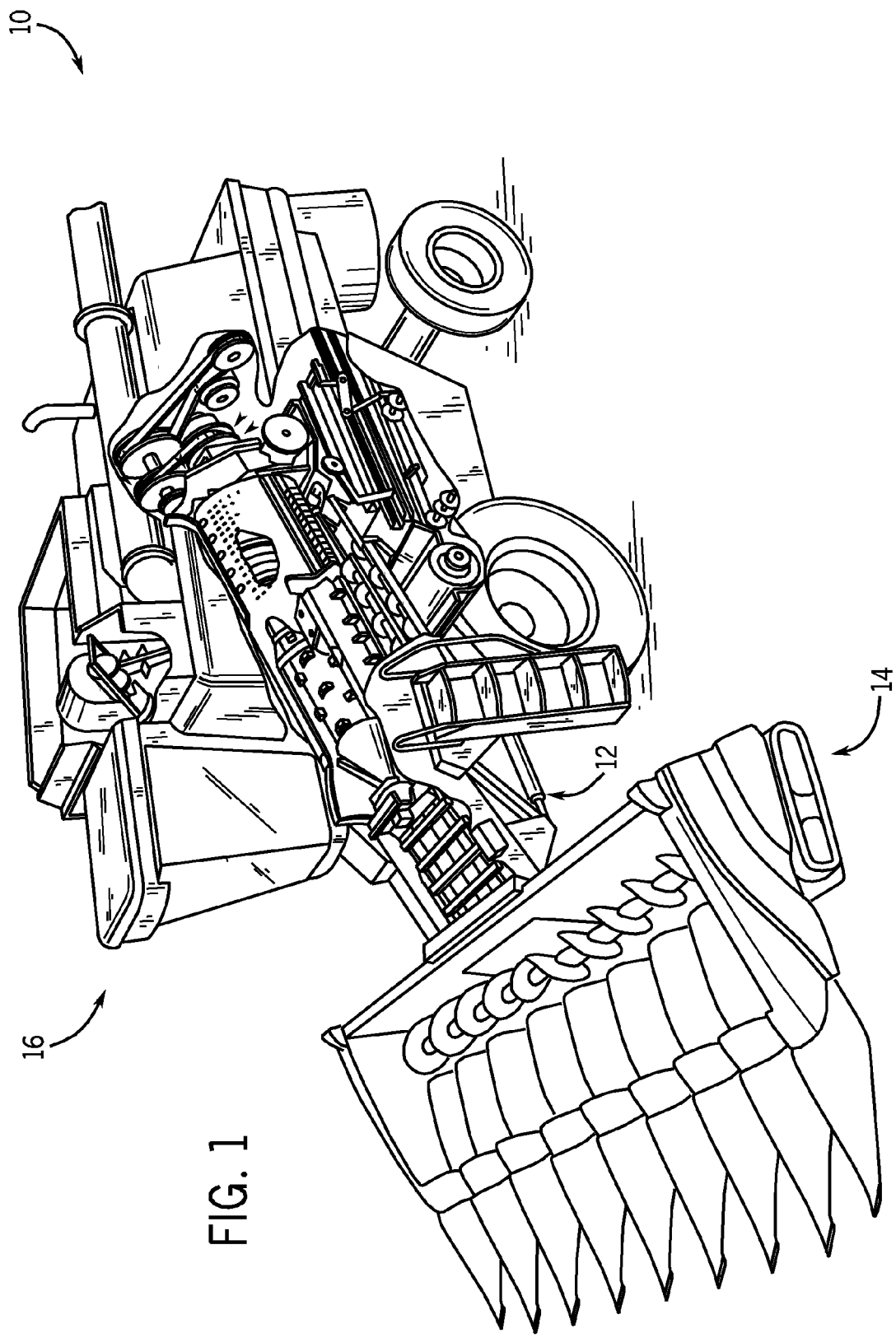
FIG. 1 is a perspective view of an embodiment of a harvester with a feeder assembly that may include a self-adjusting object deflector assembly.

Turning now to the drawings, FIG. 1 is a perspective view of a harvester 10 (e.g., combine) with a feeder assembly 12 that may include a self-adjusting object deflector assembly. The harvester 10 may harvest grains such as barley, corn, flax, oats, rye, soybeans, wheat, and so forth. Accordingly, the harvester 10 is configured to remove desired portions of plants from the ground, and to separate the plant portion into a first agricultural material and a second agricultural material. For example, the harvester may be configured to separate corn into ears and stalks. While harvesting corn, the corn cobs may interfere with the feeder assembly 12 as corn feeds into the harvester 10 for processing. In order to facilitate flow of agricultural material through feeder assembly 12, the feeder assembly 12 may include a self-adjusting object deflector assembly that blocks corn cobs from feeding between a chain or belt and the gears or sprockets that drive them.

The harvester 10 employs a cutting assembly 14 to remove the desired portion of a plant. An operator of the harvester 10 may be seated in a cab 16, and may monitor the operation of the cutting assembly 14 and other systems of the harvester 10. After removing the plants, the harvester 10 transports the plants to a feeder assembly 12. The feeder assembly 12 moves the plants from the cutting assembly 14 into the harvester 10 for processing. Once inside the harvester 10, the plants undergo various processes that separate the plant into different agricultural products (e.g., grain, cobs, chaff, straw). The different agricultural products may then exit the harvester 10 for later use or disposal.

Figure 2:
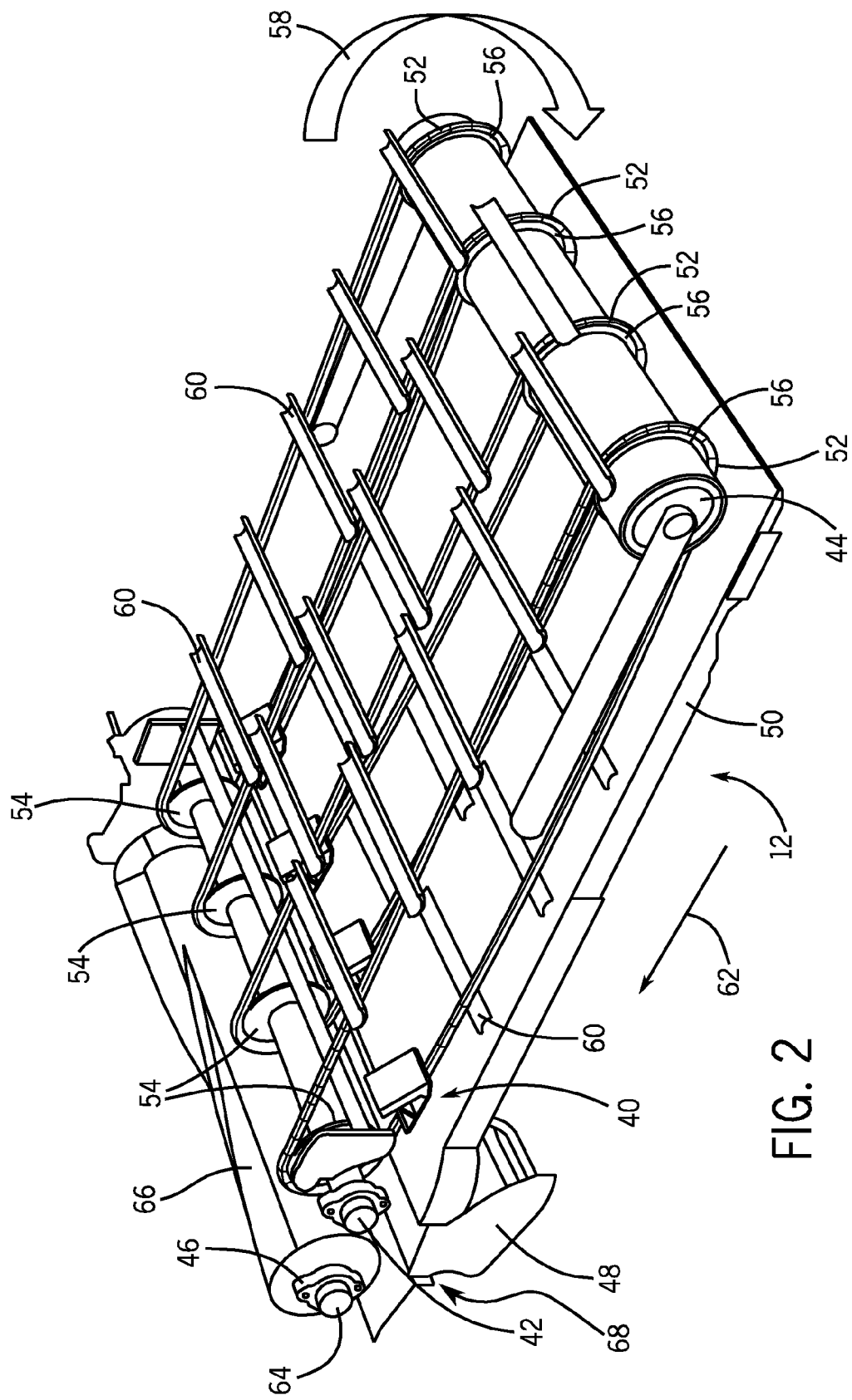
FIG. 2 is a perspective view of an embodiment of a feeder system that may be employed within the harvester of FIG. 1.

FIG. 2 is a perspective view of an embodiment of a feeder system 12 that may be employed within the harvester of FIG. 1. The feeder system 12 includes a self-adjusting object deflector assembly 40 configured to facilitate material flow through the feeder system 12 by deflecting and redirecting the agricultural material. The illustrated feeder system 12 includes a first shaft 42, a second shaft 44, a beater 46, a rock catcher (e.g., sump) 48, a bottom housing portion 50, and chains or belts 52. As illustrated, the four belts or chains 52 wrap around the first shaft 42 and the second shaft 44. In other embodiments, more or fewer chains or belts (e.g., 1, 2, 3, 4, 5, 6, 7, or more may be employed). In further embodiments, there may be a combination of belts and chains.

As illustrated, the chains or belts 52 are oriented in a perpendicular arrangement between the first shaft 42 and the second shaft 44. In order to maintain the chains or belts 52 in this perpendicular arrangement, the first shaft 42 includes sprockets 54 that engage links or apertures in the chains or belts 52. The sprockets 54 maintain alignment of the chains or belts 52, and enable the first shaft 42 to drive the chains or belts 52. In other embodiments, the first shaft 42 may include gear teeth that engage the links or apertures in the chains or belts 52, and thus maintain alignment and enable the first shaft 42 to drive the chains or belts 52. The second shaft 44 includes flanges 56 that block the chains or belts 52 from sliding along the length of the second shaft 44. In other embodiments, the second shaft 44 may include sprockets or gear teeth that engage the links or apertures in the chains or belts 52 to align and maintain the chains or belts 52 in the proper position.

In operation, a drive rotates the first shaft 42. The rotation of the first shaft 42 rotates the sprockets 54. As the sprockets 54, rotate their teeth engage the chains or belts 52, thereby pulling the chains or belts around the first shaft 42 in the direction 58 (e.g., a clockwise direction). Accordingly, the rotation of the first shaft 42 inducing the chains or belts 52 to rotate around the first shaft 42 and the second shaft 44 in a continuous loop. As illustrated, the chains or belts 52 are connected to one another with slats 60. As the slats 60 rotate around the first shaft 42 and the second shaft 44 they capture agricultural material. More specifically, as the slats 60 rotate around the second shaft 44 they capture agricultural material (e.g., corn cobs), and pull the material between the second shaft 44 and the housing portion 50. The slats 60 continue to pull the agricultural material along the housing portion 50 in the direction 62 (i.e., toward the first shaft 42 and the beater 46). The slats 60 continue to pull the agricultural material past the first shaft 42 and into the beater 46. The slats 60 then rotate around the first shaft 42, and travel back to the second shaft 44 to collect additional agricultural material. The beater 46 rotates about an axis 64. As the beater 46 rotates lengthwise flanges 66 contact the agricultural material, and other debris (e.g., rocks), traveling in the direction 62. As the flanges 66 contact rocks, sufficient force is imported to drive the rocks into slot 68 that guide the rocks into the rock catcher 48.

As the agricultural material (e.g., corn cobs) moves in the direction 62, it may flow upwardly through openings between the slats 60 and the chains or belts 52. This agricultural material may then feed into the interface between a chain or belt 52 and a corresponding sprocket 54 on the first shaft 42. The agricultural material between the chains or belts 52 and the sprocket 54 may induce the chains or belts 52 to separate from the teeth on the sprocket 54, thereby causing the links or apertures in the chains or belts 52 to skip teeth on the sprockets 54 or to completely disengage from the sprockets 54. If the chains or belts 52 disengage or lose synchronization with the sprocket 54, additional strain may be induced within the remaining chains or belts 52, thereby interfering with flow through the feeder and/or reducing the longevity of the feeder. Accordingly, the feeder assembly 12 includes a self-adjusting object deflector assembly 40 that blocks the agricultural material from feeding between the sprockets 54 and the chains or belts 52. In the present embodiment, there are four self-adjusting object deflectors 40, one for each chain or belt 52/sprocket 54. In other embodiments, there may be more or fewer self-adjusting object deflectors 40 (e.g., 1, 2, 3, 4, 5, 6, 7, 8, or more), in order to correspond to the number of chains or belts 52 and sprockets 54.

Figure 3:
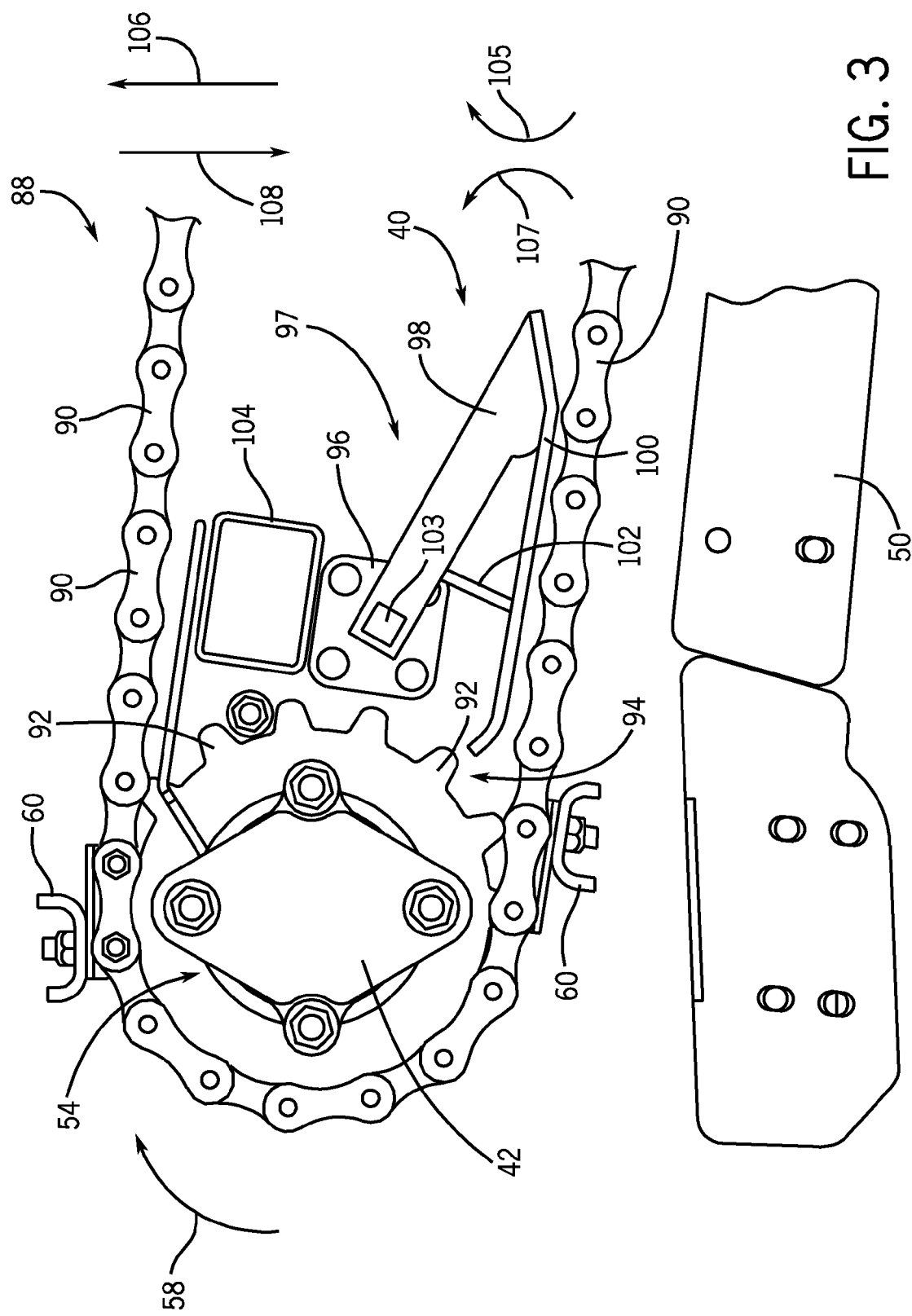
FIG. 3 is a partial side view of an embodiment of a feeder system with a self-adjusting object deflector assembly.

FIG. 3 is a partial side view of an embodiment of a feeder system with a self-adjusting object deflector assembly 40. As illustrated, the chain 88 includes links 90. The links 90 engage teeth 92 on the sprocket 54. When the sprocket 54 rotates with the shaft 42, the teeth 92 engage the links 90 in the chain 88, thereby pulling the chain around the sprocket 54 in a clockwise direction 58. As illustrated, the self-adjusting object deflector assembly 40 is positioned in front of the sprocket 54, thereby deflecting agricultural material away from location region 94 adjacent to the chain/sprocket interface (i.e., where the sprocket teeth 92 engage the links 90 in the chain 88). Thus, the self-adjusting object deflector assembly 40 blocks agricultural material from interfering with the connection between the sprocket 54 and the chain 88.

The self-adjusting object deflector assembly 40 includes a biasing member, such as the illustrated torsion member 96, and a deflector 97. The deflector includes a deflector arm 98, a skid 100, a support arm 102, and a connector arm 103. As illustrated, a support member 104 supports the self-adjusting object deflector assembly, 40 and positions it in front of the axle 42 and sprocket 54 to block agricultural material from interfering with the connection between the sprocket 54 and the chain 88. In the present embodiment, the torsion member 96 is a torsion axle. In other embodiments, the torsion member 96 may be a torsion spring or a clock spring. The torsion member 96 is connected to the deflector arm 98 and the connector arm 103. The deflector arm 98, in turn, is connected to the skid 100 and to the support arm 102. The skid 100 may be part of or separately attachable to the deflector arm 98. As illustrated, the skid 100 contacts the chain 88, or more specifically is biased against the chain by the torsion member 96.

In operation, the torsion member 96 urges the deflector arm 98 in a clockwise direction 105 toward the chain 88. Indeed, the torsion member 96 urges the deflector arm 98 in the clockwise direction 58 until the skid 100 contacts the chain 88. For example, when the chain 88 moves upward in a direction 106 away from the housing portion 50, the torsion member 96 resists this motion, thus keeping the deflector 97 in contact with the chain 88. Furthermore, when the chain 88 sags in the direction 108, the torsion member 96 rotates the deflector 97 in a clockwise direction 105 to keep the skid 100 in contact with the chain 88. Thus, the deflector 97 maintains contact with the chain 88 irrespective of the position of the chain 88

For example, the agricultural material may force the chain 88 in an upward direction 106 away from the housing portion 50 as the material flows between the housing portion 50 and the chain 88. The movement of the chain 88 in the direction 106 induces the skid 100 and the deflector arm 98 to rotate in a counter-clockwise direction 107. The torsion member 96 facilitates the counter-clockwise motion of the skid 100 and deflector arm 98, but also applies a clockwise force in direction 105, thereby driving the skid 100 into contact with the chain 88. As the flow of agricultural material decreases, the chain 88 may sag or move in the direction 108. The torsion member 96 applies a clockwise force in direction 105 on the deflector arm 98. This force rotates the deflector arm 98, thereby keeping the skid 100 in contact with the chain 88 as it sags or lowers. Accordingly, the deflector 97 remains in contact with the chain 88. With the skid 100 in contact with the chain 88, the deflector arm 98 deflects the agricultural material away from the region 94, i.e., the point where the sprocket teeth 92 engage the links 90 in the chain 88. Thus, the deflector arm 98 is in a position to deflect agricultural material away from the region 94 regardless of the material flow rate.

Figure 4:
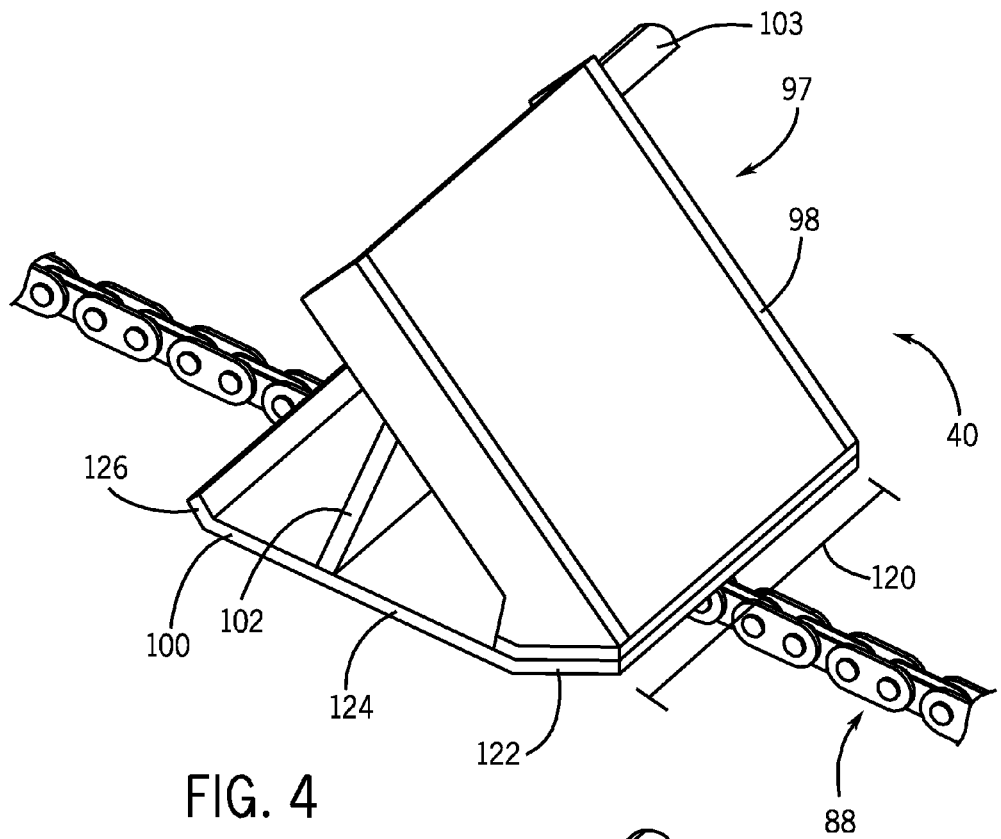
FIG. 4 is a perspective view of an embodiment of a self-adjusting object deflector assembly.

FIG. 4 is a perspective view of an embodiment of a self-adjusting object deflector assembly 40. As illustrated, the self-adjusting object deflector assembly 40 extends over the chain 88 to deflect agricultural material away from the chain (e.g., material riding on top of the chain or near the chain). As illustrated, the connector bar 103 extends from the deflector arm 98 to connect the arm 98 to the torsion member 96. A width 120 of the deflector area 98 is particularly selected to deflect material away from the chain 88. The width 120 may vary depending on the type of crop, or other design considerations (e.g., distance between the chains, etc.).

As explained above, the skid 100 contacts a top portion of the chain 88. The skid 100 includes an angled front portion 122, a flat middle portion 124, and an angled rear portion 126. The angled portions 122 and 126 reduce resistance between the skid 100 and the chain 88, and reduce the possibility of interference with movement of the chain. As illustrated, the middle portion 124 rests on the chain 88. The skid 100 may be formed from a hard plastic or another suitable material that reduces wear to the chain 88. As explained above, the skid 100 may be separable from the deflector 97, thus facilitating replacement of the skid 100 when it wears out. A separable skid 100 may enable construction of the deflector arm 98 and the connector arm 103 from more durable materials (e.g., metal). In other embodiments, the skid 100 may be integral with the deflector 97. Furthermore, some embodiments may include a support arm 102. The support arm 102 may limit excessive bending of the skid 100 during operation. Excessive bending of the skid 100 may cause the skid 100 to lose contact with the chain and/or separate from the deflector arm 98.

Figure 5:
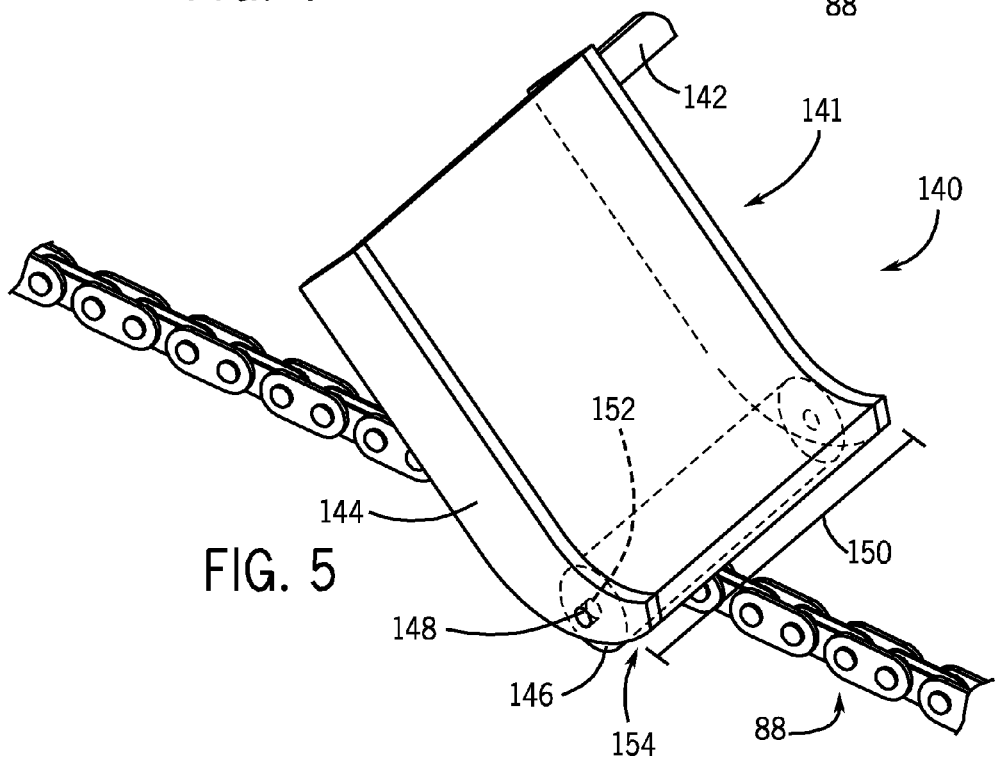
FIG. 5 is a perspective view of another embodiment of a self-adjusting object deflector assembly according to an embodiment.

FIG. 5 is a perspective view of another embodiment of a self-adjusting object deflector assembly 140. As illustrated, the self-adjusting object deflector assembly 140 includes a deflector 141 that contacts the chain 88 to deflect agricultural material away from the chain (e.g., material riding on top of the chain or near the chain). As illustrated, the self-adjusting object deflector assembly 140 includes a connector bar 142, and the deflector 141 includes a deflector arm 144, a roller 146, and an axle 148. The connector bar 142 extends from the deflector arm 144 to connect the arm 144 to the torsion member 96. A width 150, of the deflector arm 144 is particularly selected to deflect material away from the chain 88. The width 150 may vary depending on the type of crop, or other design considerations (e.g., distance between the chains, etc.). The deflector arm 144 includes an angled portion 154. The angled portion 154 reduces resistance between the deflector arm and the chain 88, and reduces the possibility of interference with movement of the chain.

In the present embodiment, the deflector 141 contacts the chain 88 with a roller 146 instead of a skid. The roller 146 is connected to the deflector arm 144 with an axle 148 that extends through apertures 152 in the deflector arm 144. As illustrated, the roller 146 contacts the chain 88. As the chain 88 moves, the roller 146 rotates, thereby reducing abrasive contact with the chain 88. Accordingly, the roller 146 may be constructed of a more durable material (e.g., metal). In some embodiments, the roller 146 may be formed from hard plastic or another material that further reduces wear on the chain 88. As illustrated, the roller may be separable from the deflector 141, thus, facilitating periodic replacement of the roller 146. A separable roller 146 may enable construction of the deflector arm 144 and connector arm 142 out of more durable materials (e.g., metal).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A feeder assembly for an agricultural harvester, comprising:
   a frame;
   a first shaft connected to the frame including a sprocket;
   a second shaft opposite the first shaft;
   a chain extending around the first shaft and the second shaft establishing an upper run and a lower run, and engaging the sprocket defining a connection therebetween;
   a self-adjusting object deflector assembly that self-adjusts and is attached to a support member of the frame and positioned between the first shaft and the second shaft, in front of the first shaft, and adjacent to the first shaft and the connection, wherein the self-adjusting object deflector assembly comprises a deflector positioned entirely above a section of a lower run of the chain and a biasing member, and
   the biasing member connected to the deflector to bias a skid thereof against the lower run of the chain to prevent agricultural material from entering an interface between the chain and the first shaft, wherein at least a portion of the skid extends under at least a portion of the sprocket.

2. The feeder assembly of claim 1, wherein the connection between the chain and the first shaft is formed by teeth of the sprocket engaging the chain.

3. The feeder assembly of claim 1, wherein the first shaft is connected to a drive, and the drive induces the first shaft to rotate.

4. The feeder assembly of claim 1, comprising a second chain extending around the first shaft and the second shaft.

5. The feeder assembly of claim 4, comprising at least one slat extending between the chains.

6. The feeder assembly of claim 1, wherein the deflector includes a deflector arm.

7. The feeder assembly of claim 6, wherein the skid is connected to the deflector arm.

8. The feeder assembly of claim 7, wherein the skid is removable from the deflector arm.

9. The feeder assembly of claim 6, wherein the biasing member comprises a torsion member connected to the deflector arm, and configured to rotationally bias the deflector arm toward the chain.

* * * * *